Aug. 12, 1969 W. R. LORD 3,460,765
APPARATUS FOR INJECTING LIQUID INTO A GAS LINE
Filed Sept. 15, 1967

INVENTOR
W. R. Lord
BY McLean, Morton & Boustead
ATTORNEYS

United States Patent Office 3,460,765
Patented Aug. 12, 1969

3,460,765
APPARATUS FOR INJECTING LIQUID INTO A GAS LINE
Walter R. Lord, Longview, Tex., assignor to Sinclair Research, Inc., New York, N.Y., a corporation of Delaware
Filed Sept. 15, 1967, Ser. No. 667,900
Int. Cl. B05b *1/32;* F16k *51/00*
U.S. Cl. 239—533          4 Claims

ABSTRACT OF THE DISCLOSURE

Apparatus for injecting liquid into a gas line comprising a ball valve assembly attached to a lateral inlet to the gas line and suitable for having inserted therethrough a nozzle assembly which has an interior liquid supply duct terminating in an opening to the gas line; the nozzle assembly further being provided with adjustable plunger means for varying the cross-sectional area of the nozzle opening.

---

This invention relates to an apparatus for the injection of a liquid into a flowing, high pressure gas stream.

It is known, for example, that odorless gases of a poisonous and toxic nature, such as natural gas, should have injected thereinto vapors of a strongly smelling material so that the escape of the gas may be readily detected. Additionally, alcohol is sprayed into high pressure gas lines such as those transmitting natural gas to act as an antifreeze with respect to the moisture, i.e., the small particles of moisture being carried in suspension by the gas itself.

The present apparatus is suitable for injecting such liquid into gas lines, even those under substantial pressure, and, in general, comprises a support attached to the high pressure gas line including a ball-type valve through which a nozzle for injection of the liquid to be atomized can be extended when it is to be used. Other objects and advantages of this invention will become more apparent from the detailed description hereinafter, taken in conjunction with the accompanying drawings.

Figure 1:
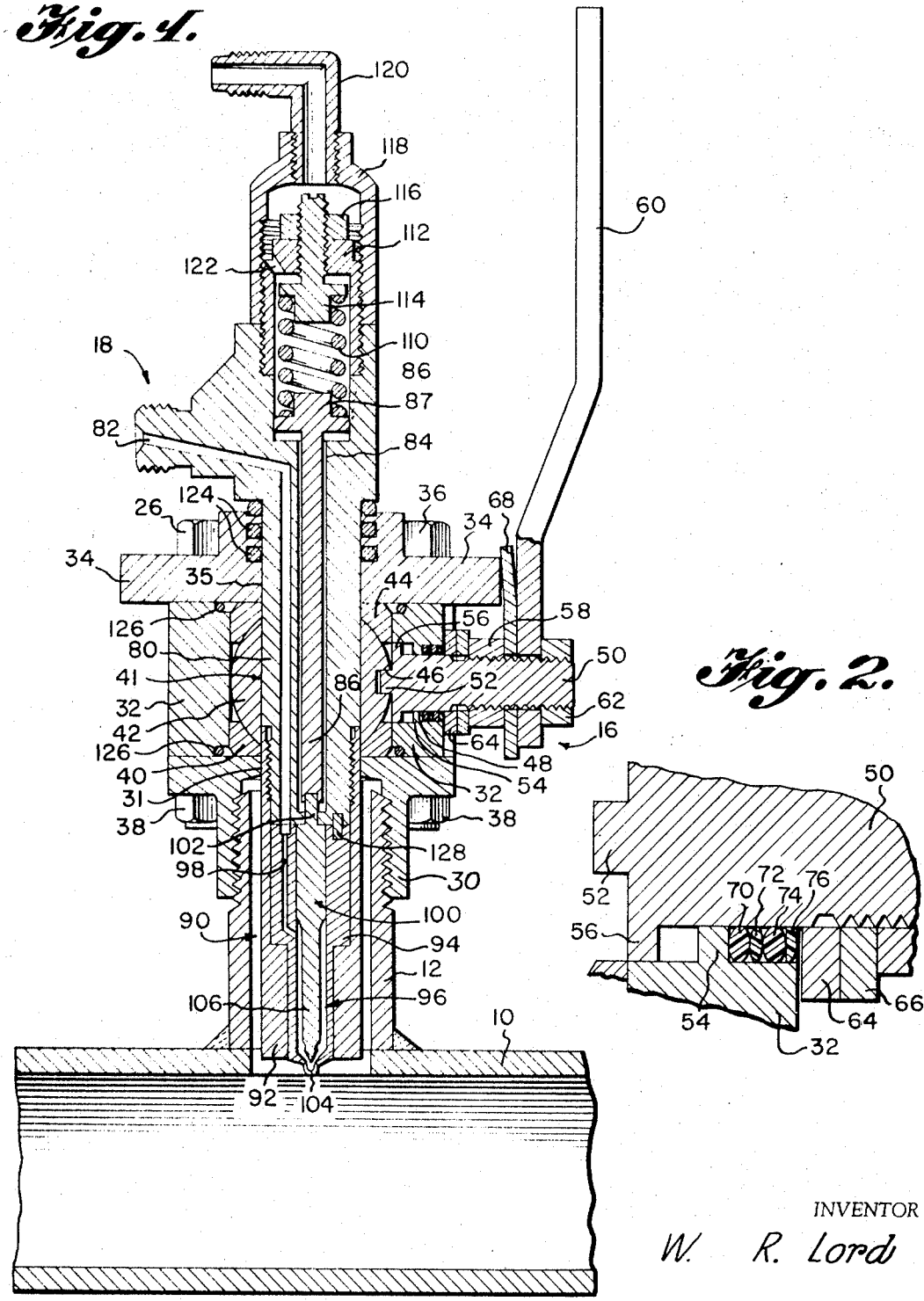
Figure 2:
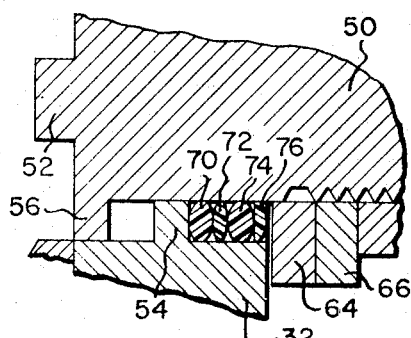

Referring to the drawings, FIGURE 1 illustrates, in cross section, a support, valve and nozzle arrangement in accordance with this invention. FIGURE 2 illustrates an enlarged, cross-sectional view of a portion of the valve stem of the device including the bearing assembly therefor.

In the drawing, a high pressure gas line is illustrated by pipe 10 to which is welded, or otherwise secured, by a communicating threaded pipe section 12. Pipe section 12 forms a support for a valve assembly generally designated by numeral 16, and a nozzle assembly, generally designated by numeral 18, which extends through valve assembly 16 to a point adjacent to or in pipe 10.

Referring in more detail to valve assembly 16, this valve assembly includes a threaded pipe end 30 which screws onto pipe 12. A ball valve housing 32 rests on pipe end 30 and is secured thereto by nozzle holder 34, bolts 26 and 36, and nuts 38. A lower ball valve seat 40 rests on pipe end 30 within ball valve housing 32. The ball itself, 42, rests in seat 40 and is held in place by an upper ball valve seat 44, also arranged within ball valve housing 32. Ball 42 has a slot 46 therein arranged opposite an opening 48 in the ball valve housing 32. This slot is provided for rotation of ball 42 and opening and closing of the valve passage 41.

Opening and closing of the valve passage 41, i.e., rotation of ball 42, is accomplished by a valve stem 50 which is rotated by handle 60. Valve stem 50 has a key 52 on the front end thereof which fits into slot 46 in ball 42, and valve stem 50 extends outwardly of ball 42 through opening 48 in ball valve housing 32. In this respect it should be noted that the drawings do not accurately represent the relative sizes of valve stem 50 and ball valve housing 32. That is, to permit assemblage of the device the diameter of the vertical passage 41 in ball valve housing 32 must be large enough to accommodate the passage of valve stem 50 therethrough and out the lateral opening 48. To facilitate depicting the several details surrounding valve stem 50, however, the latter is presented somewhat larger in size.

Shoulder 56 on valve stem 50 cooperates with shoulder 54 on ball valve housing 32 at the opening 48 to hold stem 50 in place. Handle 60 has a rectangular opening therein and fits over a portion of the valve stem 50 which has flat sides, e.g., is of rectangular shape, to provide a driving connection whereby the handle 60 can rotate valve stem 50. Nuts 58 and 62 are threaded onto valve stem 50 on opposite sides of handle 60 to hold the handle 60 in place. Washers 64 and 66 space the handle 60 the desired distance away from the ball valve housing 32. Member 68 includes a stop (not shown) which limits movement of handle 60; also, member 68 can be a spring leaf for applying spring pressure to keep handle 60 steady. A bearing assembly is provided for the valve stem 50 to aid in rotation thereof and extend the life of the valve stem. This bearing assembly is more clearly illustrated in the fragmented enlargement of FIGURE 2 and includes, in the direction outwardly from shoulder 54 on valve housing 32, a thrust bearing 70, a seal 72, a thrust bearing 74 and a seal 76, which bearings and seals can be made of a self-lubricating material such as nylon or Teflon.

In one position of ball 42, the passage 41 which extends through the ball coincides with the passage 31 in pipe end 30 and the passage 35 in nozzle holder 34 so that nozzle assembly 18 may extend therethrough. In another, rotated position of ball 42, with the nozzle assembly withdrawn, the ball seals the space extending between passages 31 and 35, thus providing a closed valve and preventing leakage of gas from high pressure gas line 10.

Nozzle assembly 18 comprises a nozzle body 80 having a first, or liquid, passage 82 therein for introduction of liquid to be atomized, and a second, or central, passage 84. A spindle 86, placed inside central passage 84, serves to control the degree of atomization by the nozzle assembly as hereinafter described. The upper end of liquid passage 82 is connected to an external, pressurized source (not shown) of the liquid to be atomized.

A nozzle head, generally designated by numeral 90, is secured to the lower end of nozzle body 80 by a nozzle nut 92. Nozzle head 90 comprises a nozzle head body 94 having a central passage 96 and a liquid passage 98 to the side of the central passage. A piston-like nozzle stem 100, which includes a keyed connection 102 to the spindle 86, is slidably arranged within the central passage 96 of the nozzle head body 94. The nozzle stem 100 is raised or lowered by movement of the spindle 86, and the lower portion 106 (of narrow cross-section) of nozzle stem 100, by the raising or lowering movement, thus provides for adjustment of the area of the passage leading to exit opening 104 on nozzle head body 94. By raising or lowering the nozzle stem 100 and, accordingly, dilating or constricting the cross-sectional area of the lower end of the central passage 96 which leads to exit opening 104, the amount of liquid entering into, and to be atomized within, pipe 10 is controllable. Passage 98 in nozzle head body 94 communicates with passage 82 in nozzle body 80 and liquid to be atomized passes first through passage 82 and then through passage 98 into central passage 96 in the nozzle head body 94, at which point the liquid surrounds the lower portion 106 of nozzle stem 100.

The vertical movement of nozzle stem 100 is in part controlled by spring 110 which rests on the head 87 of spindle 86. A spring support 112 is threaded into the upper part of nozzle body 80 and holds a spring guide 114 against which the upper part of the spring 110 is fitted. A nut 116 secures the spring guide 114 to the spring support 112 so that the compression of the spring 110 may be adjusted to vary the cross-sectional area of the central passage 96 heading to exit opening 104 through control of the location of spindle 86 and nozzle stem 100. A casing 118 surrounds spring support 112. A pressurized air supply (not shown) is connected to the casing 118 through nipple 120 to supply control air for controlling the compression of spring 110. This control air passes through passage 122 in the nozzle support 112 to urge the closing of exit opening 104 by applying pressure at the head 87 of spindle 86 and counteract the pressure of the spring 110 which normally adjusts the opening of 104 and the degree of atomization.

O-rings 124, provided with seats in nozzle holder 34, seal the passage containing the nozzle assembly 18 when the nozzle assembly is inserted through passage 41 in ball 42. Seals 126 are also provided at the ball valve seats 40 and 44. Elements 128, only one of which is shown, provide a positive connection between nozzle head body 94 and nozzle body 80 so that passages 82 and 98 will be in communication and to prevent rotation of these bodies relative to each other during operation of the nozzle.

It is claimed:

1. An apparatus for injecting liquid into a gas line, which comprises housing means having a central passage therethrough and adaptable to be sealably engaged to an inlet conduit of a gas line; a ball valve rotatably seated within said housing and having a central passage therethrough; handle means for rotating said ball valve between a position wherein the ball valve central passage is in communication with the housing central passage and a position wherein the ball valve seals off the housing central passage; an elongated, removable nozzle adaptable to be sealably inserted through the housing central passage and the ball valve central passage when said passages are in communication, said nozzle having an internally disposed liquid supply duct connecting a liquid inlet opening in said nozzle with a liquid exit opening in said nozzle, said duct being operable for carrying liquid from an external supply source through said nozzle and into the gas line; a vertically reciprocable plunger comprising an elongated body terminating at its upper end in a plunger head and at its lower end in a closure tip, said plunger being mounted within said nozzle and operable for adjusting the cross-sectional area of the liquid exit opening in said nozzle and said plunger being disposed so as to be axially urged upward and away from said liquid exit opening by gas pressure within the gas line; and adjustable biasing means operating on said plunger head to axially urge said plunger downward and toward said liquid exit opening.

2. The apparatus of claim 1 wherein said plunger is reciprocably mounted within a central longitudinal passage within said nozzle, said passage terminating at its upper end in a housing for said plunger head and terminating at its lower end in said liquid exit opening; wherein further said liquid supply duct opens into the side of the nozzle central passage at a point intermediate the ends of said passage; and wherein further said plunger is operable when in its downwardmost position for closing both the opening of said liquid supply duct to said central passage and the liquid exit opening and, when in its upwardmost position, for allowing liquid to pass from said supply duct through said nozzle central passage and out said liquid exit opening.

3. The apparatus of claim 2 wherein said biasing means comprises a compressed helical spring connected at one end to said plunger head and at the other end to a base element which is rigidly attached to said plunger head housing, the positioning of said base element in said housing being adjustable as regards the distance between the base element and said liquid exit opening.

4 The apparatus of claim 3 wherein said plunger head housing is a longitudinal chamber the interior walls of which meet in a sealing relationship with the periphery of the plunger head, and wherein further said housing has means for introduction of pressurized gas thereinto for impingement against the upper side of said plunger head thereby axially urging said plunger downward.

References Cited

UNITED STATES PATENTS

| 3,255,974 | 6/1966 | Roosa | 239—533 |
| 3,279,706 | 10/1966 | Kennedy | 239—533 |
| 3,409,226 | 11/1968 | Steiger | 239—533 |

EVERETT W. KIRBY, Primary Examiner

U.S. Cl. X.R.

137—315; 239—453